US011282137B2

(12) United States Patent
McDonald et al.

(10) Patent No.: US 11,282,137 B2
(45) Date of Patent: Mar. 22, 2022

(54) SECURE ELEMENT METHOD FOR DISTRIBUTED ELECTRONIC LEDGER

(71) Applicant: The Toronto-Dominion Bank, Toronto (CA)

(72) Inventors: Ian James McDonald, Toronto (CA); Adam Douglas McPhee, Toronto (CA); Perry Aaron Jones Haldenby, Toronto (CA); Paul Mon-Wah Chan, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 352 days.

(21) Appl. No.: 15/287,815

(22) Filed: Oct. 7, 2016

(65) Prior Publication Data

US 2018/0101906 A1    Apr. 12, 2018

(51) Int. Cl.

| *G06Q 40/04* | (2012.01) |
| *G06Q 20/06* | (2012.01) |
| *G06Q 20/20* | (2012.01) |
| *G06Q 20/40* | (2012.01) |

(52) U.S. Cl.
CPC ........... *G06Q 40/04* (2013.01); *G06Q 20/065* (2013.01); *G06Q 20/204* (2013.01); *G06Q 20/405* (2013.01); *G06Q 2220/00* (2013.01)

(58) Field of Classification Search
CPC ...................................................... G06Q 20/12
See application file for complete search history.

(56) References Cited

U.S. PATENT DOCUMENTS

| 8,655,919 | B2* | 2/2014 | Cachin .................... G06F 21/64 707/792 |
| 9,167,425 | B1 | 10/2015 | McDonald |
| 9,610,476 | B1* | 4/2017 | Tran ........................ A63B 69/38 |
| 9,852,393 | B2* | 12/2017 | Walden ................ C07D 311/80 |
| 9,948,467 | B2* | 4/2018 | King ..................... H04L 9/3239 |
| 10,389,518 | B2* | 8/2019 | Chen ..................... H04L 9/3236 |

(Continued)

FOREIGN PATENT DOCUMENTS

| WO | 2015/135018 A1 | 9/2015 | |
| WO | WO-2017178956 A1 * | 10/2017 | ........... G06F 21/645 |

OTHER PUBLICATIONS

Plutus White Paper (Jun. 30, 2016). https:/plutus.it.*

(Continued)

*Primary Examiner* — Peter Ludwig
(74) *Attorney, Agent, or Firm* — Duane Morris LLP

(57) ABSTRACT

A device has a secure element including a memory that stores at least one address, a set of rules, and a state of an asset. A processor is configured for receiving a request to change the state of the asset associated with the address, validating the request in the case where changing the state of the asset according to the request complies with the set of rules, and invalidating the request in the case where changing the state of the asset according to the request violates the set of rules. A communications module is coupled to the secure element for transmitting information responsive to the request to a distributed network of peer processors for recording a change in the state of the asset in a distributed electronic ledger in the case where the secure element validates the request.

21 Claims, 10 Drawing Sheets

(56) References Cited

U.S. PATENT DOCUMENTS

| | | | |
|---|---|---|---|
| 2011/0246369 A1* | 10/2011 | de Oliveira | G06Q 20/382 705/64 |
| 2013/0151400 A1 | 6/2013 | Makhotin et al. | |
| 2014/0006295 A1* | 1/2014 | Zeiler | G06Q 30/018 705/317 |
| 2014/0164771 A1 | 6/2014 | Danree et al. | |
| 2016/0085955 A1* | 3/2016 | Lerner | G06F 21/31 726/20 |
| 2016/0196553 A1* | 7/2016 | Barhydt | G06Q 20/3829 705/71 |
| 2016/0292672 A1* | 10/2016 | Fay | G06Q 20/363 |
| 2017/0005804 A1* | 1/2017 | Zinder | H04L 9/3247 |
| 2017/0346693 A1* | 11/2017 | Dix | H04L 9/3247 |
| 2018/0034642 A1* | 2/2018 | Kaehler | H04L 9/14 |
| 2018/0084042 A1* | 3/2018 | Finlow-Bates | H04W 12/04 |
| 2018/0102013 A1* | 4/2018 | Spanos | G06F 21/64 |
| 2018/0121892 A1* | 5/2018 | Dwivedi | G06Q 20/065 |
| 2018/0198631 A1* | 7/2018 | Yang | H04L 9/3239 |
| 2018/0253702 A1* | 9/2018 | Dowding | G06Q 20/06 |
| 2018/0264347 A1* | 9/2018 | Tran | G16H 50/20 |

OTHER PUBLICATIONS

Blockchain and Smart Card Technology (Mar. 2017). Secure Technology Alliance.*

Peters, Gareth W et al., "Understanding Modern Banking Ledgers through Blockchain Technologies: Future of Transaction Processing and Smart Contracts on the Internet of Money", arXiv: 1511. 05740v1, Nov. 18, 2015, pp. 1-33.

Birch, Dave, "Banks and blockchains and clouds, oh my", in tomorrow's transactions, Dec. 10, 2014, downloaded via the internet on Mar. 29, 2016 at URL: http://www.chyp.com/banks-and-blockchains-and-coulds-oh-my/, 4 pages.

Spoor, Laszlo "What is a Secure Element?", Bell ID Blog, May 22, 2014, downloaded via the internet on Mar. 29, 2016 at URL: http://blog.bellid.com/what-is-a-secure-element, 5 pages.

Unofficial Draft of work-in-progress specification entitled "Secure Element API", Editors: Olivier Potoniée and Ming Yin, Oct. 8, 2014, 29 pages.

\* cited by examiner

SECURE ELEMENT METHOD FOR DISTRIBUTED ELECTRONIC LEDGER

FIELD

This disclosure relates generally to improvements in computer related technology.

BACKGROUND

Distributed electronic ledgers, such as block chains, have generated interest in a variety of fields as a decentralized data storage mechanism with reliable redundant validation.

A block chain includes a distributed database comprising blocks of data records (e.g., transaction records). Each block has a timestamp and a hash of the immediately preceding block. Blocks record and confirm valid transactions. Users known as miners perform proof-of-work in the course of generating the blocks. The amount of time needed to perform the proof-of-work can introduce significant delays between the time a valid transaction is first received by one of the miners and incorporation of the transaction into a block.

SUMMARY

In some embodiments, a device comprises a secure element including a memory, a processor and a communications module. The memory stores at least one address, at least one key associated with the address, a set of rules, and a state of an asset. The processor is configured for receiving a request to change the state of the asset associated with the address, validating the request in the case where changing the state of the asset according to the request complies with the set of rules, and invalidating the request in the case where changing the state of the asset according to the request violates the set of rules. The communications module is coupled to the secure element for transmitting the request to a distributed network of peer processors for recording a change in the state of the asset in a distributed electronic ledger in the case where the secure element validates the request, but not transmitting the request in the case where the secure element invalidates the request.

In some embodiments, a point-of-service terminal comprises a first secure element including a memory that stores an address, a key associated with the secure element, and a set of instructions, and a first processor configured by the set of instructions for: generating a first request for a second secure element to perform a first action, the request including the address, receiving a second request from the second secure element to change a state of an asset in response to the first request, where the asset is tracked in a distributed electronic ledger, the second request having a version identifier (ID) of a program stored in the second secure element, applying at least one rule to the second request based on the version ID; approving a second action in the case where applying the at least one rule validates the second request. A secure element reader is coupled to the first processor for transmitting the first request to the second secure element, and receiving the second request from the second secure element.

In some embodiments, a method comprises: initiating a request to change a state of an asset by providing the request to a secure element including a memory that stores at least one address, at least one key associated with the address, and a set of rules; validating the request within the secure element in the case where changing the state of the asset according to the request complies with the set of rules; invalidating the request within the secure element in the case where changing the state of the asset according to the request violates the set of rules; and transmitting the request to a distributed network of processors for changing the state of the asset in the case where the secure element validates the request.

DETAILED DESCRIPTION

Figure 1:
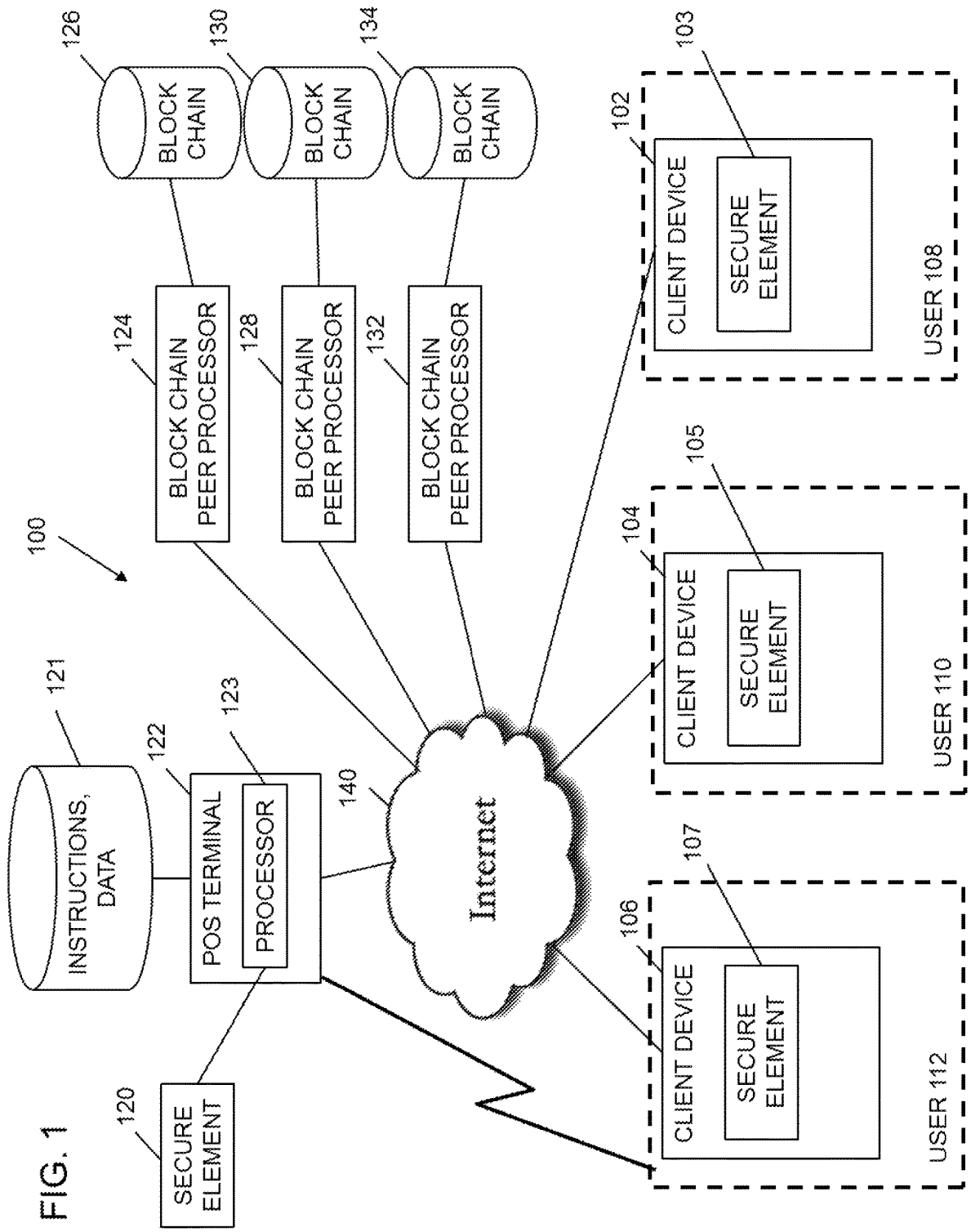
FIG. 1 is a block diagram of a system according to some embodiments.

This description of the exemplary embodiments is intended to be read in connection with the accompanying drawings, which are to be considered part of the entire written description. In the description, terms concerning attachments, coupling and the like, such as "connected" and "interconnected," refer to a relationship wherein devices are connected to one another either directly or indirectly through intervening structures, or relationships, unless expressly described otherwise.

One advantage of block chain based ledgers is the public nature of the block chain architecture that allows anyone in the public to review the content of the ledger and verify ownership. The decentralized block chain approach also makes the system fairly robust in comparison to centralized server systems by allowing multiple distributed networks to verify the contents of a single ledger. This allows for redundancy and minimizes risk of falsification of ledgers. The size of the block chain often makes it an onerous task to search and pin point a specific transaction. Searching through a block chain construct is a computationally intense process.

To achieve a desired level of confidence that a party transferring a block chain tracked asset (e.g., a buyer making a payment for goods using digital currency) is not double spending, the recipient (e.g., a seller) typically waits until a desired number of block chain peer processors have published a block in the block chain containing the transaction transferring that asset, before the recipient transfers the goods to the buyer. For example, the seller may wait until six blocks containing the transaction are published, which can take more than an hour in some cases, before the seller delivers goods or services to the buyer. This extended delay between payment and delivery is atypical of retail sales in bricks-and-mortar stores, where buyers often expect immediate delivery of goods or services upon tender of payment. Such delays can impede the widespread use of digital currency in settings and transactions where immediate delivery of goods or services is expected upon tender of payment.

This disclosure provides a system and method for reducing the time till approval of an exchange involving a transfer of an asset tracked is a distributed electronic ledger such as a block chain ledger. The sender and recipient of the asset each have devices containing respective secure elements. The secure element in the sender's device enforces block chain transaction rules and will not transmit (to the recipient or to the block chain peer processors) any transaction that would result in double spending. The secure element in the recipient's device can confirm that the sender's device is executing valid (trusted) software and has not been tampered with. Upon receipt of a transaction from the sender's secure element, the recipient can pre-confirm the transaction and authorize an exchange that is conditioned on approval of the transaction, without waiting for a confirmation from the block chain. This mechanism provides a sufficient degree of certainty to allow use of block chain tracked assets as a medium of exchange in situations (e.g., brick-and-mortar retail sales) involving near-real-time delivery of goods or services upon tender of payment.

FIG. 1 is a block diagram of a system 100 in accordance with some embodiments of the present disclosure. System 100 may be a computing environment including one or more block chain peer processing systems 124, 128, 132, client devices 102, 104, and 106, each having a respective secure element 103, 105, 107, and a communications network 140 (e.g., the Internet) connecting various components of system 100. A point of service (POS) terminal 122 is located in a merchant's facility. The POS terminal 122 has an internal secure element 120. Although three client block chain peer processors 124, 128, 132 are shown in this example, any number of block chain peer processors can be included. Although three client devices 102, 104, 106 are shown in this example, any number of client devices can be included. Although one POS terminal 122 is shown in this example, any number of POS terminals can be included.

In some embodiments of this disclosure, the secure elements 103, 105, 107 in each respective client 102, 104, 106 stores the status of each asset associated with a wallet 318 (FIG. 3) associated with an address of the respective user 108, 110, 112. For example, in the case where the assets are digital currency accounts tracked in a distributed electronic ledger, such as a block chain ledger, the secure element 103 stores the balance of each respective wallet 318, 328 (FIG. 3) tracked by that secure element 103. The secure element 103 stores a portion of the block chain code 332, allowing the secure element 103 to confirm that a transaction transferring an asset from its wallet satisfies the block chain rules (e.g., does not double spend the asset). If the wallet balance is sufficient to complete the transfer, and the transaction complies with any (optional) personal rules that are applicable to this transferor, the transferor transmits the transaction to the block chain peer processors 124, 128, 132 for confirmation. The secure element 103 also applies its signature and transmits an exchange confirmation to the recipient. The transmission of the exchange confirmation by the secure element 103 includes the amount transferred, an identifier (ID) of the version of the block chain software being executed by the secure element 103 and a hash of that software. The recipient can use this version ID and the received hash to confirm that the software in the secure element 103 has not been corrupted or compromised. In the case where the wallet balance is not sufficient to complete the transfer or violates any personal constraint associated with the wallet, the secure element 103 will not initiate a payment from that wallet but sends an exchange failure message to the recipient. In the case where the balance is insufficient to complete the transfer, the secure element 103 also transmits a failure notification to the block chain peer processors 124, 128, 132 for recording in the block chain.

A recipient (e.g., another digital currency account holder or a merchant) has a secure element 120 that can verify that a transfer was made by a secure element 103 running a valid version of a program embodying the pertinent block chain rules. When the merchant's secure element 120 receives the exchange confirmation, as long as the merchant's secure element 120 determines that the transfer is from a secure element 103 operating in accordance with block chain rules, the merchant trusts the sender and can assume that there is a high probability the transfer will subsequently be confirmed by the block chain peer processors. The merchant can rely on this self-validation (pre-confirmation) by the secure element 103, and immediately transfer an asset to the buyer (user 108) in exchange for the buyer's transfer of a block chain tracked asset to the seller, without waiting for confirmation of the transaction transferring the asset from the block chain.

This protocol of exchange confirmations between secure elements provides rapid validation, which may be before confirmation is received from the block chain. This near real-time validation (pre-confirmation) can make use of digital currency suitable for a commercial retail setting where a buyer expects to take delivery immediately after tendering payment. For example, in some embodiments, a merchant relies on this pre-confirmation by secure elements in the sender's and recipient's devices to authorize immediate delivery of goods upon pre-confirmation of payment from a digital currency account for any purchase up to a predetermined threshold amount.

Exchange Protocol

Figure 2:
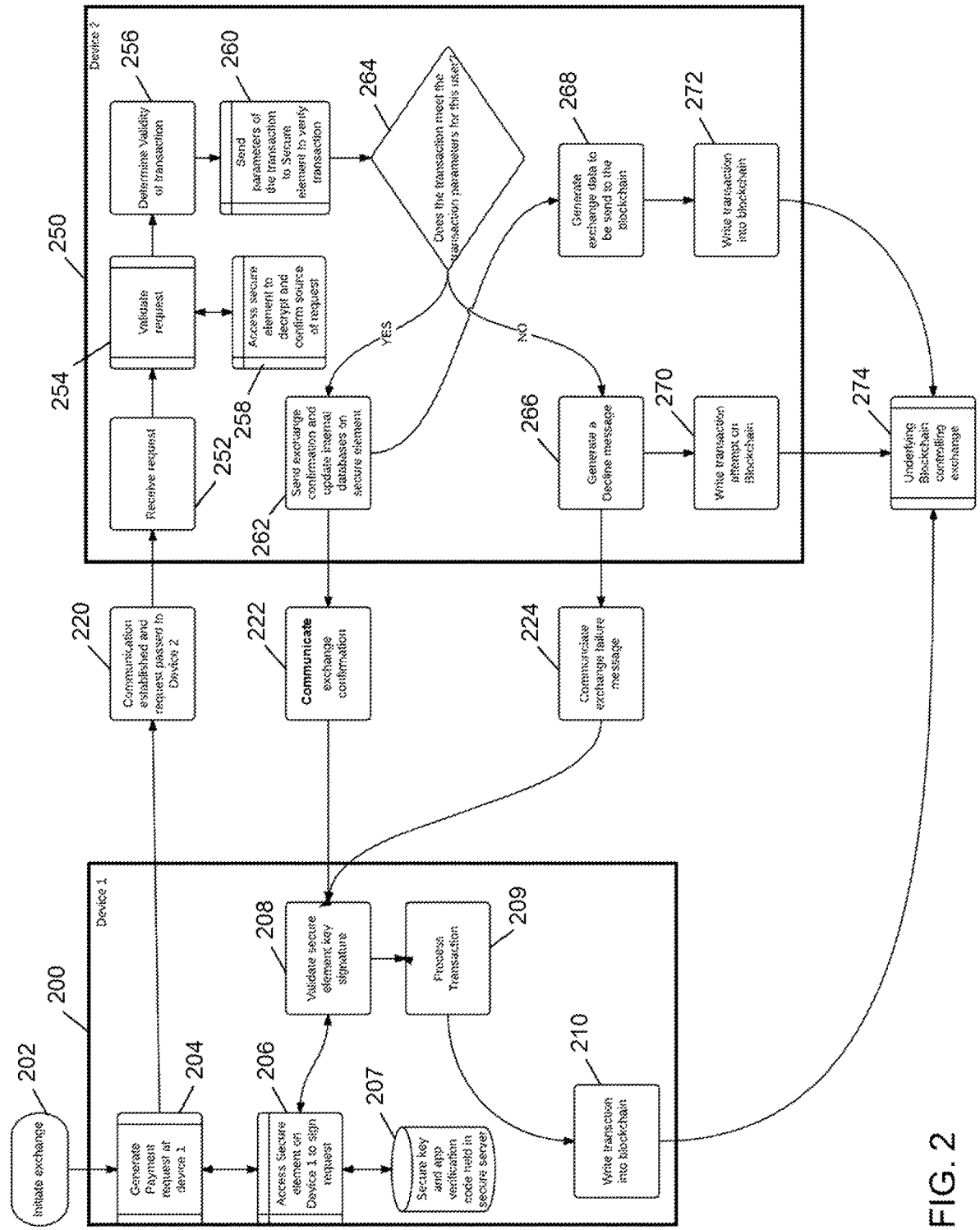
FIG. 2 is a schematic diagram of operation of the system of FIG. 1 according to some embodiments.

FIG. 2 is a schematic diagram showing an example of a method and protocol according to some embodiments. The system includes at least two devices 200 and 250 having respective secure elements (not shown in FIG. 2). Device 200 is a recipient of an asset, and can be associated with an individual user or a merchant. Device 250 is a transferor of an asset, and can be a purchaser of goods or services, or an individual making a gift or donation.

In the method of FIG. 2, the transferor of an asset sends a transaction request (transferring an amount from transferor's account to transferee's account) to the block chain peer processors 124, 128, 132. Additional exchange confirmations are exchanged between transferor and transferee. In some embodiments, the transferee also sends the block chain peer processors 124, 128, 132 an acknowledgement of the exchange confirmation the transferee receives from the transferor. By providing a record from the transferee to the block chain when the transferee receives an exchange confirmation from the transferor, the block chain documents any case where the transferee never actually receives exchange confirmation, an indication that the asset was not transferred to the intended transferee (e.g., in the case where the transferor inputs an incorrect recipient address).

Each of the devices 200 and 250 in FIG. 2 can correspond to any of the client devices 102, 104, 106 or POS terminal 122 in the example of FIG. 1. In some exchanges, the sender (transferor) is a client device 102 and the recipient (transferee) is a client device 104. In some exchanges, the sender (transferor) is a client device 102 and the recipient (transferee) is a POS terminal 122 or other merchant device. In some exchanges, the sender (transferor) is a POS terminal 122 or other merchant device and the recipient (transferee) is a client device 102. In other exchanges, the sender (transferor) is a POS terminal 122 or other merchant device and the recipient (transferee) is a POS terminal 122 or other merchant device.

At block 202, an exchange is initiated. For example, the buyer may offer to buy goods in exchange for a payment in a digital currency.

At block 204, the merchant generates a request 220 for payment, which will act as a signed digital invoice. The request 220 includes an amount of the payment and a wallet address to which the asset is to be transferred. The request 220 will also contain a version ID of transaction software running in the secure element of device 200 and a hash of that transaction software, to validate request for payment.

At block 206, the device 200 accesses its secure element to sign the request, using the secure key and application verification code 207, which can be stored in a secure server.

Device 200 sends a communication packet 220 ("the first request) to device 250, requesting a payment. The data packet containing the first request sent from device 200 to device 250 includes a signature in the wrapper of the data packet. This wrapper has information related to which version of software the secure element 200 is running, and a hash of that software, which the device 250 can use to determine if the secure element of device 200 has been corrupted or compromised. For example, the secure element of device 200 can run a hash of the rules engine run by device 200, using a key stored in or generated by the secure element for signature purposes. The secure element in the device 200 can run this hash of the rules engine every time the request for payment is generated, and append it in the data packet 220. By repeating the hashing operation every time the first request is sent, the device 200 provides information that allows immediate detection by the device 250 in the case where the software in the secure element of device 200 has become corrupted or has been tampered with.

At block 252, device 250 receives the packet 220 containing the request for payment from device 200. At block 254, the device 250 provides the request to the secure element of device 250 for validation. At block 258, the secure element of device 250 decrypts the packet and confirms the source of the request. Block 258 determines whether the software in the secure element of device 200 can be trusted, or the software appears to have been corrupted or tampered with. For example, the device 250 can independently compute a hash of the version of the transaction processing software specified in the packet 220, and determine whether the hash computed in device 200 matches the hash computed in device 250. This allows the secure element in device 250 to determine whether the request 220 has come from valid software in another secure element and can be trusted to send a valid request for payment to device 200. Conversely, in the case where the secure element software in device 200 has been modified, the hash values computed in the respective secure elements of devices 200 and 250 will be different from each other, and the device 250 will reject a request for payment from the device 200.

The same verification of sending secure element application version ID and a hash of the secure element program is used in both directions, each time there is a communication between the devices 200 and 250. The sender includes a hash of its software and wraps the payload data with this information and the version ID to show that the packet 220, 222, or 224 was created by a valid secure element (i.e., a secure element running trusted software that has not been corrupted or tampered with). This provides a basis for device 250 to trust the request for payment it receives from device 200, and for device 200 to trust a message from device 250 indicating that device 250 has made a payment by transferring a block chain tracked asset.

At block 256 and 260, the secure element of device 250 determines the validity of the transaction. At block 260 the device 250 sends the parameters of the transaction (wallet ID and amount) to the secure element of device 250 to verify the transaction. In the case where the secure element of the device 250 has more than one wallet, the buyer is asked (by a user interface) to select which wallet to use in some embodiments.

At block 264 the secure element of device 250 applies a subset of the block chain rules for the tracked asset that will be used to tender payment. In some embodiments, the asset is real or personal property, or a smart contract, the asset has a state, and the secure element stores the state. The rules can apply conditions to determine whether the state of the asset is within a set of states for which the requested change of state is permitted. For example, in some embodiments, the asset is a digital currency account and the state is the balance of the account. In some embodiments, the secure element of device 250 stores a history of all transactions involving that account and a current balance of the account. The secure element of device 250 enforces the rule against double spending by determining whether the value of the asset to be used to make payment is greater than or equal to the amount of the payment to be made.

In some embodiment, at block 264, the secure element of device 250 also applies personal constraints associated with the specific wallet. At the time a wallet is created, the owner of the wallet can enter one or more optional parameters that restrict the manner in which the wallet is used thereafter.

For example, the secure element of device 250 can enforce controls on spending. The secure element can limit spending based on one or more parameters. These are parameters that may be added to the account at the account creation stage, where the rules/parameters are added to the blockchain to create conditional spending. They are stored on the blockchain and in the secure element. In some embodiments, these conditions are first loaded upon the creation of the account on the secure element, and updated when the distributed blockchain synchs with the blockchain on the secure element. Some exemplary parameters include, but are not limited to: earmarked spending limits on different types of purchases, daily or weekly spending limits, conditional spending limits (if $X is sent to recipient A, then a limit of $Y is set for sending to recipient B). For example, personal constraints can limit spending to a percentage of available balance, or to a threshold amount within a predetermined period (e.g., $10,000 per month). The personal constraints can limit spending according to a previously entered budget allocation. The personal constraints can limit spending from a wallet depending on location of a transaction. The user can set a parameter for the maximum amount to spend within a defined geographic region or in a pre-determined business establishment. (e.g., The constraint can limit spending to a pre-determined amount at a casino). The personal constraints can also be used to limit the stores or sellers at which the asset can be used, to increase use of a loyalty program. In some embodiments, if a user attempts to buy a particular SKU at a non-preferred store, the secure element can query whether that same item is available from a preferred merchant in the loyalty program, and refuse the transaction if the user tries to spend the asset elsewhere to purchase a SKU that is also sold by a preferred merchant. In some embodiments, the secure element looks at individual SKUs and looks at the age of buyer. For example, in some embodiments, the buyer's age is checked, to prevent an underage user from using the wallet to purchase alcohol or cigarettes. The buyer's age may be included in the account creation during "Knowing Your Customer" (KYC) of the account, and can be included in the original creation of the account. Parental controls can limit the types of goods or services purchased, and can limit the ratings of audio, video, or literary works that the buyer is permitted to purchase.

If the transaction conforms to the block chain rules and any personal constraints in effect, then at block 262, the device 205 sends an exchange confirmation 222 and updates its internal databases in the secure element of device 250. For example, if the asset is a digital currency account, the device 250 sends a confirmation to the device 200, and updates its internal record of the balance of the wallet from which the digital currency is being transferred. The exchange confirmation 222 is generated and sent to device 200. The exchange confirmation 222 has a wrapper including a signature, the version ID of the software running in the secure element of device 250, and a hash of the software. The payload of the exchange confirmation 222 includes the amount to be transferred and the source and destination addresses.

At block 268, the device 250 also generates exchange data to be sent to the block chain (e.g., a transaction transferring digital currency from an address associated with a wallet of the secure element of device 250 to an address associated with a wallet of the secure element of device 200). At block 272, the secure element of device 250 transmits the transaction to the block chain peer processors 124, 128, 132 for recording in the block chain ledger at block 274.

In the case where the secure element of device 250 determines at block 264 that the transaction does not satisfy the applicable parameters for this wallet, then at block 266 the secure element of the device 250 generates a "decline" message. In some embodiments, at block 270, the secure element 270 sends a record of a declined transaction to the block chain peer processors 124, 128, 132, and the secure element of device 250 also sends an exchange failure message 224 to device 200.

At block 208, the secure element of device 200 receives exchange confirmations 222 and exchange failure messages 224. At block 209, the secure element of device 200 processes the transaction. In some embodiments, transactions are only transmitted to the block chain peer processors 124, 128, 132 from the sender (buyer) 250; device 200 does not send a record to the block chain upon receipt of an exchange confirmation from device 250. Device 200 waits for confirmation from the block chain that the transaction has been successfully processed by block chain processors 124, 128, 132 and incorporated into new blocks of the block chain.

In other embodiments, at block 210, when device 200 processes a transaction (based on the information in the exchange confirmation 222), device 200 confirms receipt by sending a record to the block chain peer processors 124, 128, 132 for incorporation into the block chain.

At block 274, block chain processing is performed. In some embodiments, the block chain peer processors process the transaction records 272 from the sender and the transaction attempt records 270 from the sender.

In other embodiments, at block 274, the block chain records the transaction records from both the sender and the recipient. The block chain peer processors process the transaction records 272 from the sender and the transaction attempt records 270 from the sender, and also process transaction exchange confirmations 210 (indicating receipt) from the recipient. The use of transaction exchange confirmations 210 in the block chain provides loss protection to the parties to the transaction.

For example, in the case where device 250 tries to update the Block Chain with a completed transaction, but device 200 never sends a confirmation 210, the transaction is not considered complete. Because there's no complementary transaction record from the recipient 200, the transaction can be deemed fraudulent or erroneous. In some embodiments using confirmations by the sender and the recipient, unless both sides of the transaction generate messages to the block chain the transaction is considered incomplete. In some embodiments, incomplete transactions are listed separately in the block chain. The transaction is only finalized and confirmed in the blockchain if the complementary transaction is received.

The use of secure element to secure element confirmations allows implementation of recovery mechanisms for a block chain. For example, in the case where the sender transfers digital currency to an unassigned address or incorrectly types the destination address, the absence of an acknowledgement by a secure element shows that the transaction was never completed, and can be used as evidence that the amount that has not been confirmed by a recipient should be re-credited to the sender's account.

Transmitting acknowledgements from the recipient's secure element to the block chain avoids the loss of the asset in the case where a sender transferring digital currency to an incorrect address, for which the sender does not have a key and cannot recover the asset.

Client Devices

Figure 3:
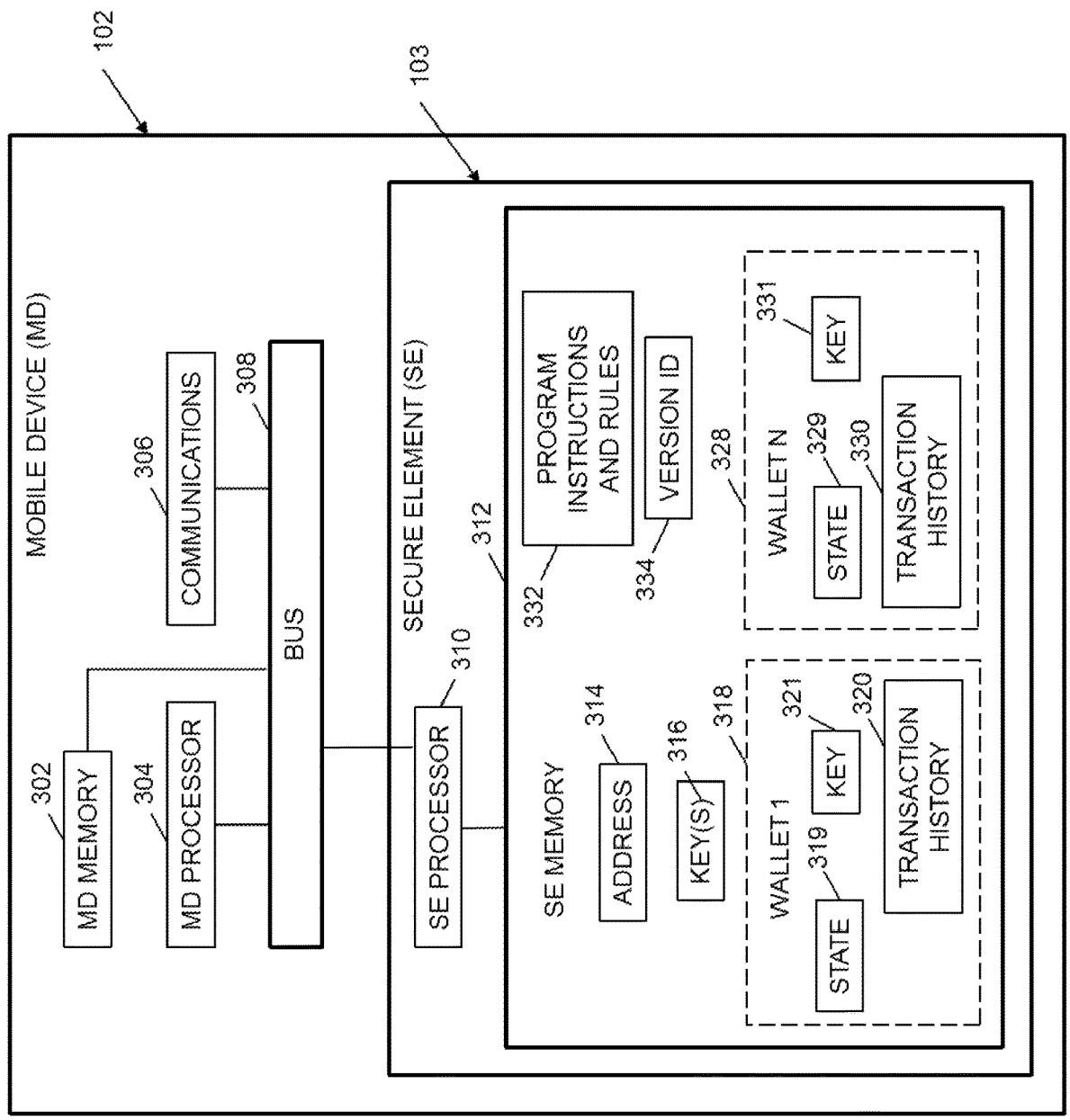
FIG. 3 is a block diagram of an example of the client device in the system of FIG. 1.

FIG. 3 is a block diagram of an exemplary client device 102 according to some embodiments. Each of the client devices 102, 104, and 106 can be a computing device, such as a hashing computer, a personal computer, or a mobile device, such as a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device. At least one of client devices 102, 104, and 106 may be associated with one or more users, such as users 108, 110, and 112, as shown in FIG. 1. For example, user 110 operates client device 104 and causes it to perform one or more operations in accordance with various embodiments.

Each client device 102, 104, 106 includes one or more tangible, non-transitory memories 302 (e.g., non-transitory machine readable storage medium) that store data and/or software instructions, and one or more processors 304 configured to execute software instructions. Client devices 102, 104, and 106 may include one or more display devices (not shown) that display information to a user and one or more input devices (e.g., keypad, keyboard, touchscreen, voice activated control technologies, or any other type of known input device, not shown) to allow the user to input information to the client device. Each client device 102, 104, 106 has a bus 308 and a communications module 306 which communicates via wired or wireless links, which can include one or more of a local area network ("LAN"), a wireless LAN, a radio frequency (RF) network, a Near Field Communication (NFC) network, (e.g., a "WiFi" network), a personal area network (e.g., Bluetooth), or the like, for communicating with other devices.

Each client device 102, 104, and 106 has a respective secure element 103, 105, 107 with a respective memory 312 storing an address 314 and key 316 associated with the secure element. The memory 312 of the secure element 103 also stores one or more software application programs 332 run by the secure element 103 of the client device 102 and executed by the one or more processors 310 of that secure element 103, and a version ID 334 of the program 332. The memory 312 of secure element 103 can contain one or more digital wallets 318, 328. Each digital wallet 318 (328) has a respective state 319 (329) and a respective transaction history 320 (330). The transaction history 320 (330) lists all of the transactions which change the state of the digital wallet 318 (328) (i.e., receive digital currency in the wallet, or send digital currency from the wallet to another address). A given client 102 can have any number of digital wallets 318 (328).

In some embodiments, the secure element 103, 105, 107 in each respective client device 102, 104, 106 stores software application programs 332 that, when executed by one or more processors 310 in the secure element 103, perform operations that establish communications with other client devices 103, 105, 107 and/or one or more of peer processing systems 124, 128, 132 (e.g., across network 140), and that send transactions to peer systems 124, 128, 132, for recording in a block-chain ledger 126, 130, 134 generated and maintained. In some embodiments, the program 332 includes a subset of the block chain rules executed by block chain peer processors 124, 128, 132, which determine whether a transaction is valid. For example, in some embodiments, the program 332 compares an amount to be transferred by a transaction to the state (balance) 319 of the sender's digital wallet 318. If the balance 319 is sufficient, the secure element 103 transmits the transaction. If the balance 319 is not sufficient, the secure element 103 does not transmit the transaction.

In some embodiments, the stored application(s) 332 in each secure element 103, 105, 107 include a wallet application 318, 328 provided by a business entity (e.g., a mobile wallet application or an application executable on a desktop computer). The wallet application is capable of initiating transactions denominated in one or more currencies, including digital currencies such as Bitcoin™, Ethereum™ or the like. The programs 332 in each client device 102, 104, 106 are capable of sending or receiving an asset, such as digital currency. Thus, a transaction can send digital currency from client 102 to client 104, from client 102 to merchant (e.g., POS terminal) 122, or (in the case of a return) from merchant 122 to client 102.

The secure element 103 generates and stores respective wallet keys 321, 331 for every wallet 318, 328. The secure element master key 316 embedded in the secure element 103 is used to generate keys 321, 331 for each individual wallet. In this method, both keys 321, 331 and ownerships can be verified by the secure element 103 on the device 102, reducing the amount of information about the entire data content of the transaction that is made accessible in the distributed electronic ledger.

The program(s) 332 in the secure element of each client device 102, 104, 106 also include rules for propagating a transaction of an asset. In some embodiments, the secure element computes the state of the asset after implementing any action specified by the transaction, and the rules only permit propagation of the transaction if that state is a permissible state. For example, in some embodiments where the transaction will transfer digital currency from a wallet, the rules only permit propagation of a transaction if the balance after the transaction is greater than or equal to zero (i.e., if the balance before the transaction is at least the amount to be transferred, or more). In another embodiment, the asset is a smart contract which generates a transaction upon the occurrence of an event or upon satisfaction of a condition.

In some embodiments, the programs 332 also include a module for generating a hash of the software implementing the rules. The secure element 103 includes the hash and a version ID of the software implementing the rules in the wrapper of the exchange confirmation 222 generated by the client device 102. In other embodiments, the wrapper includes a public key of the secure element 103.

Client devices 102, 104, and 106 may provide information associated with one or more actions or transactions involving the tracked assets (e.g., information identifying the actions or transaction, information identifying the assets, a public key, a digital signature, etc.) to peer systems 124, 128, 132.

The client devices 102, 104, and 106 have a communications module 306 coupled to the secure element 103 for transmitting information responsive to the request 220 to a distributed network of peer processors 124, 128, 132 for recording a change in the state of the asset in the distributed electronic ledger in the case where the secure element 103 validates the request. The information is not transmitted in the case where the secure element invalidates the request.

POS Terminal

The system 100 can also include one or more POS terminals 122. The POS terminal 122 can be a dedicated terminal, or a computer configured with a user interface and suitable reader(s) (e.g., debit/credit card reader, and/or secure element reader) permitting the user to input a transaction affecting the state of an asset tracked in the block chain.

Figure 4:
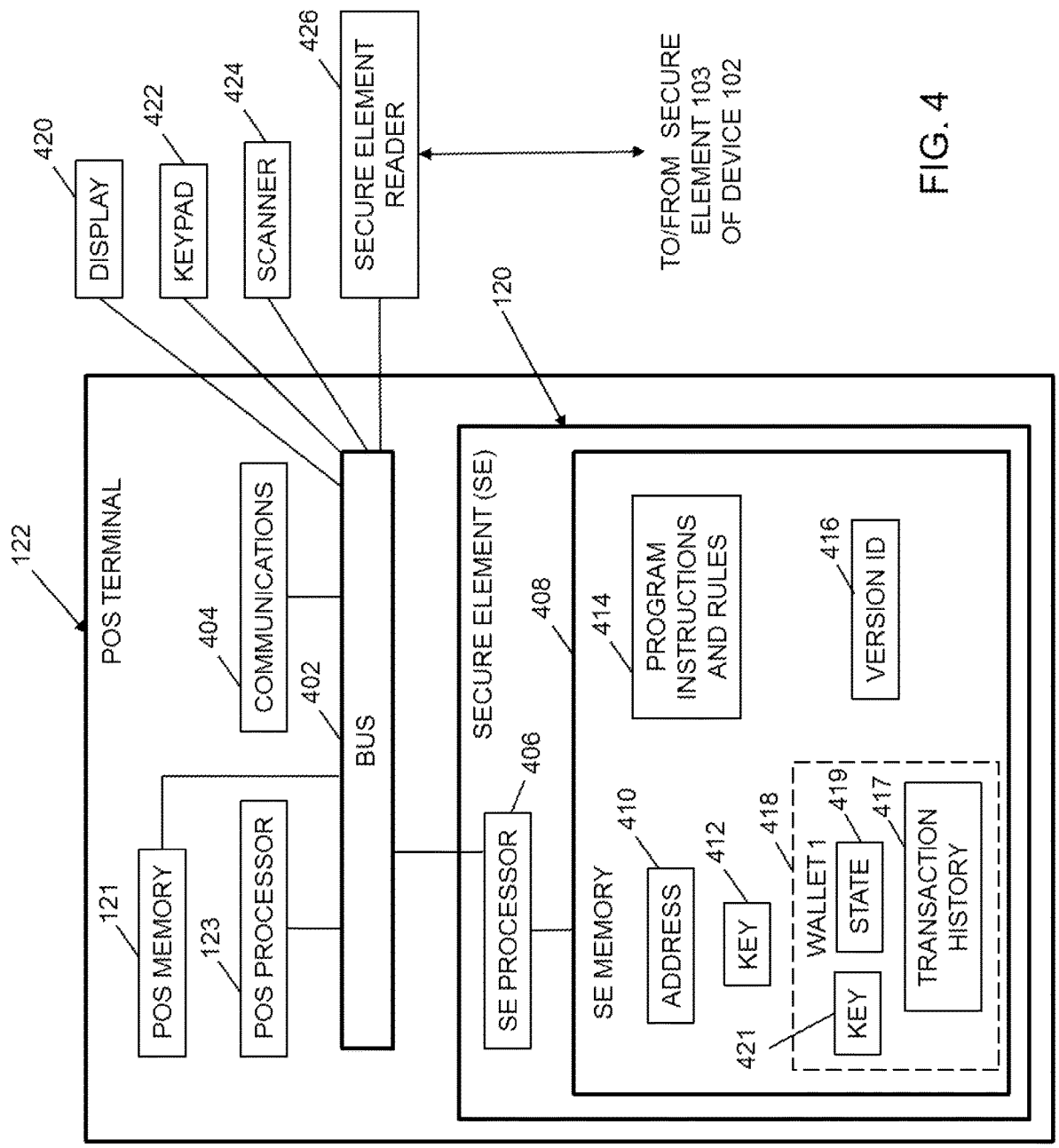
FIG. 4 is a block diagram of an example of the point-of-service terminal in the system of FIG. 1.

FIG. 4 is a block diagram of an exemplary POS terminal 122 according to some embodiments. POS terminal 122 can include a cash drawer, computer, and input/output devices, such as a display 420, keypad 422, a 1-dimensional or 2-dimensional scanner 424, and a secure element reader 426. The POS terminal 122 can also include other devices (not shown), such as a keyboard, receipt printer, and a debit/credit card reader, configured for processing retail transactions. The secure element reader 426 may be used by, or on behalf of, a buyer or retail customer to present a means of payment. In various embodiments, the means of payment can be a credit card, debit card, prepaid card, a chip card, or wallet hardware device. In some embodiments, the POS terminal 122 is equipped with an internal secure element 120. The secure element 120 stores the merchant's private key 412, and provides the merchant's signature when the secure element sends a request for payment to a buyer's secure element 103. The merchant's secure element 120 also stores one or more tracked assets such as one or more digital wallets (e.g. a wallet owned by a merchant) for receiving payments from buyers, denominated in digital currency.

In some embodiments, the POS terminal 122 has a non-transitory machine readable storage medium 121 storing a set of computer program instructions; and a processor 123 coupled to the storage medium 121, such that when the processor 123 executes the computer program instructions, the processor 123 provides an interface for a user to input a request for payment, using a secure-element-to secure-element method. The secure element 120 of the POS terminal 122 packages this request, to be sent to the buyer's secure element 103 via the secure element reader 426. The wrapper of the request includes the amount, a hash of the software of secure element 120, and the version number of the program executed by the secure element 120.

In some embodiments, the secure element reader 426 of the POS terminal 122 is coupled to transmit the request-for-payment 220 from the secure element 120 of the POS terminal 122 to the secure element 103 of the buyer's device 102 (e.g., hardware wallet, mobile phone, NFC equipped device, or the like). The secure element reader 426 also provides the secure element processor 406 of the POS terminal 122 a signature of the buyer's wallet 318, and a version ID and hash of the buyer's transaction processing software, when the buyer tenders payment using a device 102 having the secure element 103.

The secure element processor 406 of POS terminal 122 receives the signature of the buyer's secure element 103, the hash and the version ID from the secure element 103 of the buyer's device 102. Secure element processor 406 locally computes the hash of the software and compares the locally computed hash to the hash received from secure element 103. If the two hashes match, the secure element 120 trusts the software of the secure element 103 as being a valid program that has neither been corrupted nor tampered with. The secure element 120 uses the address of the buyer's wallet 318 and the amount to be transferred from the buyer's device via the secure element reader 426 for processing the exchange confirmation 222 sent by the device 102 and adding the transferred amount to the local balance of the merchant's wallet.

Upon validation of the request for payment 220, the secure element 103 in the buyer's device 102 generates and transmits a transaction for changing a state of a first asset that is included among a plurality of assets tracked in a block chain ledger. The secure element 103 also generates and transmits an exchange confirmation message 222 to the secure element 120 of POS terminal 122. For example, in the case where the asset is a digital currency account, the state is a balance of the account. A local copy of the state 419 is received in by secure element 120 and stored in the digital wallet 418 in secure element 120 Upon validation of the software in secure element 103, the secure element 120 trusts the information in the exchange confirmation 222 as indicating the buyer's asset can meet any predetermined condition (e.g., sufficient account balance) to satisfy the payment request 220. The secure element 120 of the POS terminal 122 authorizes the transaction upon pre-confirmation that the digital currency transfer transaction was issued by a secure element 103 running a valid version of the rules software 332 for confirming the sufficiency of the balance. In some embodiments, at least one of the transactions affecting the first asset (e.g., digital currency account) has not yet been recorded in the block chain ledger at a time of the pre-confirmation and authorizing.

For example, in some embodiments, the POS terminal 122 issues a record to the block chain acknowledging receipt of an exchange confirmation from the buyer corresponding to the digital currency transfer. The POS terminal 122 also updates a transaction history 417 and balance 419 of a local digital wallet 418 account that corresponds to the merchant, at a time when that transaction has not yet been recorded in the block chain ledger.

The secure element 120 generates and stores a respective wallet key 421 for every wallet 418 in the secure element. The secure element master key 412 embedded in the secure element 120 is used to generate key 421 for each individual wallet. In this method, both keys 421 and ownerships can be verified by the secure element 120 on the device 122, reducing the amount of information about the entire data content of the transaction that is made accessible in the distributed electronic ledger.

Using the secure-element-to-secure-element method described herein, the POS terminal 122 can pre-confirm a payment by a secure element 103 running trusted software 332, and authorize immediate exchange of goods or services for the buyer's tender of a transfer from a digital currency account, without waiting for confirmation from the block chain peer processors 124, 128, 132. Because the payment is made by a secure element 103 running trusted software 332, the merchant can have reasonable certainty that a pre-confirmed transaction will subsequently be confirmed by the block chain peer processors 124, 128, 132, and that double spending will not occur.

Exemplary Communications Networks

Communications network 140 may include one or more communication networks or media of digital data communication. Examples of communication network 140 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 140 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Exemplary Peer Systems

Referring back to FIG. 1, peer systems 124, 128, 132 may include one or more special purpose hardware and/or computing systems configured to execute software instructions to perform one or more operations in accordance with various embodiments. In some embodiments, peer systems 124, 128, 132 may include computing components configured to store, maintain, and generate data and software instructions. For example, each of peer systems 124, 128, 132 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In some embodiments, one or more of peer systems 124, 128, 132 are configured to receive, from client device 102 across network 140, information associated with a distribution of, transaction involving, or other action associated with one or more assets tracked within block-chain ledgers 126, 130, 134 in accordance with various embodiments.

In some embodiments, one or more of peer systems 124, 128, 132 are configured (e.g., by the executed software programs) to validate the received information and to generate a new block of the block-chain ledger 126, 130, 134. The new block includes the received information, either alone (e.g., using a "one transaction, one block" paradigm) or in combination with information identifying additional distributions, transactions, or other actions associated with one or more tracked assets (e.g., as a multiple-transaction block). In some embodiments, the one or more peer systems 124, 128, 132 may maintain the updated versions of the public ledger (i.e., the latest, longest public ledger), and may provide the updated version of the ledger to client devices 102, 104, and/or 106 (or other client devices associated with other users) upon receipt of a request across network 120 and/or at regular or predetermined intervals.

In certain instances, and in addition to a connection with network 120, peer systems 124, 128, 132 may be interconnected across a peer-to-peer network (not depicted in FIG. 1) using any of the wired or wireless communications protocols outlined above. Further, in some instances, one or more of peer systems 124, 128, 132 may function as a "miner," where any miner may be compensated in units of a virtual currency (e.g., Bitcoin™, Ethereum™) for validating the received data and for generating updated versions of the block-chain ledger.

FIGS. 5-8 show examples of exchanges between two computing devices using the secure-element-to-secure-element exchange described herein. In these examples, for simplicity, the sender (transferor) is referenced as a client device 102, and the recipient (transferee) is referenced as a POS terminal 120. In other examples, the sender can be any client device 102 or merchant's device or POS terminal 120, and the recipient can be any client device 102 or merchant's device or POS terminal 120.

Figure 5:
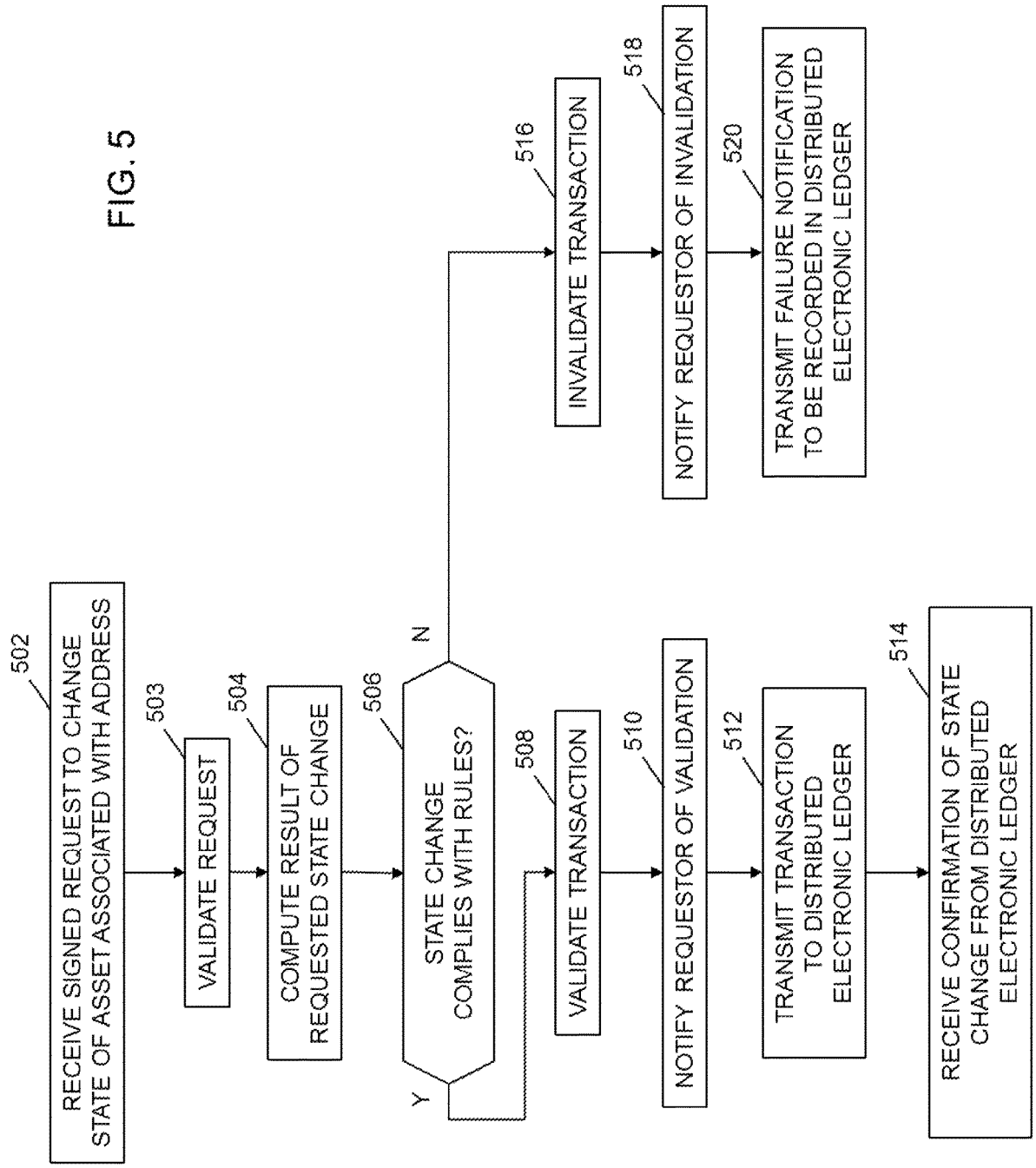
FIG. 5 is a flow chart of a sender (transferor) process according to some embodiments in an exchange using the system of FIG. 1.

FIG. 5 is a flow chart of a method performed by the sender (transferor) using secure-element-to-secure-element communication of distributed electronic ledger transactions, according to some embodiments. The distributed electronic ledger is a distributed database.

At step 502, a secure element (e.g., the secure element 103 of a client device 102, such as a buyer's mobile device) receives a signed request to change a state of an asset associated with an address. In some embodiments, the wrapper of the request includes a hash of the application program that generated the request, and the version ID of the program that generated the request.

At step 503, the secure element 103 validates the request. For example, the secure element 103 can locally compute the hash for the version of the program corresponding to the version ID, and compare the received hash to the locally computed hash. If the two hash values match, then the secure element 103 has confirmed the source of the request, and also knows that the program that generated the request has not been tampered with or corrupted, and can be trusted.

At step 504, the secure element 103 computes the result of the requested state change. That is, the secure element computes the state of the tracked asset after applying the change indicated in the request.

At step 506, the secure element 508 determines whether the state computed in step 504 is a permitted state of the asset. In some embodiments, this step determines whether the state complies with the distributed electronic ledger rules. In some embodiments, step 506 is a two-part process. The secure element 103 determines whether the state complies with the distributed electronic ledger rules. Then, even in the case where the state complies with the distributed electronic ledger rules, secure element 103 determines whether the transaction parameter satisfy any personal constraints associated with the address of the sending digital wallet in secure element 103. In the case where the state change complies with the subset of the distributed electronic ledger rules stored in the secure element 103, then step 508 is performed. In the case where the state change does not comply with the subset of the distributed electronic ledger rules stored in the secure element 103, then step 516 is performed.

At step 508, the secure element 508 validates the transaction to satisfy the request.

At step 510, the secure element 103 generates and sends an exchange confirmation to the secure element 120 that requested payment to notify the requestor of the validation.

At step 512, the secure element 103 generates and sends a transaction to the peer processors 124, 128, 132 to be recorded in the distributed electronic ledger.

At step 514, in some embodiments, the secure element 120 generates and sends a confirmation of the transaction to the peer processors 124, 128, 132 to be recorded in the distributed electronic ledger. The client device 102 receives a confirmation from the block chain that the recipient POS has acknowledged receipt in a distributed electronic ledger record.

In alternative embodiments, instead of secure element 120 sending a confirmation of the transaction to the peer processors 124, 128, 132 to be recorded in the distributed electronic ledger, the secure element 120 receives confirmation of the transaction from the block chain ledger (and only the sender 102 sends the transaction to the distributed electronic ledger for recording.

At step 516, the secure element 103 invalidates the request.

In At step 518, the secure element 103 generates and sends a transaction attempt message to the peer processors 124, 128, 132 to be recorded in the distributed electronic ledger.

At step 520, the secure element 120 generates and sends a confirmation of the exchange failure to the peer processors 124, 128, 132 to be recorded in the distributed electronic ledger.

Figure 6:
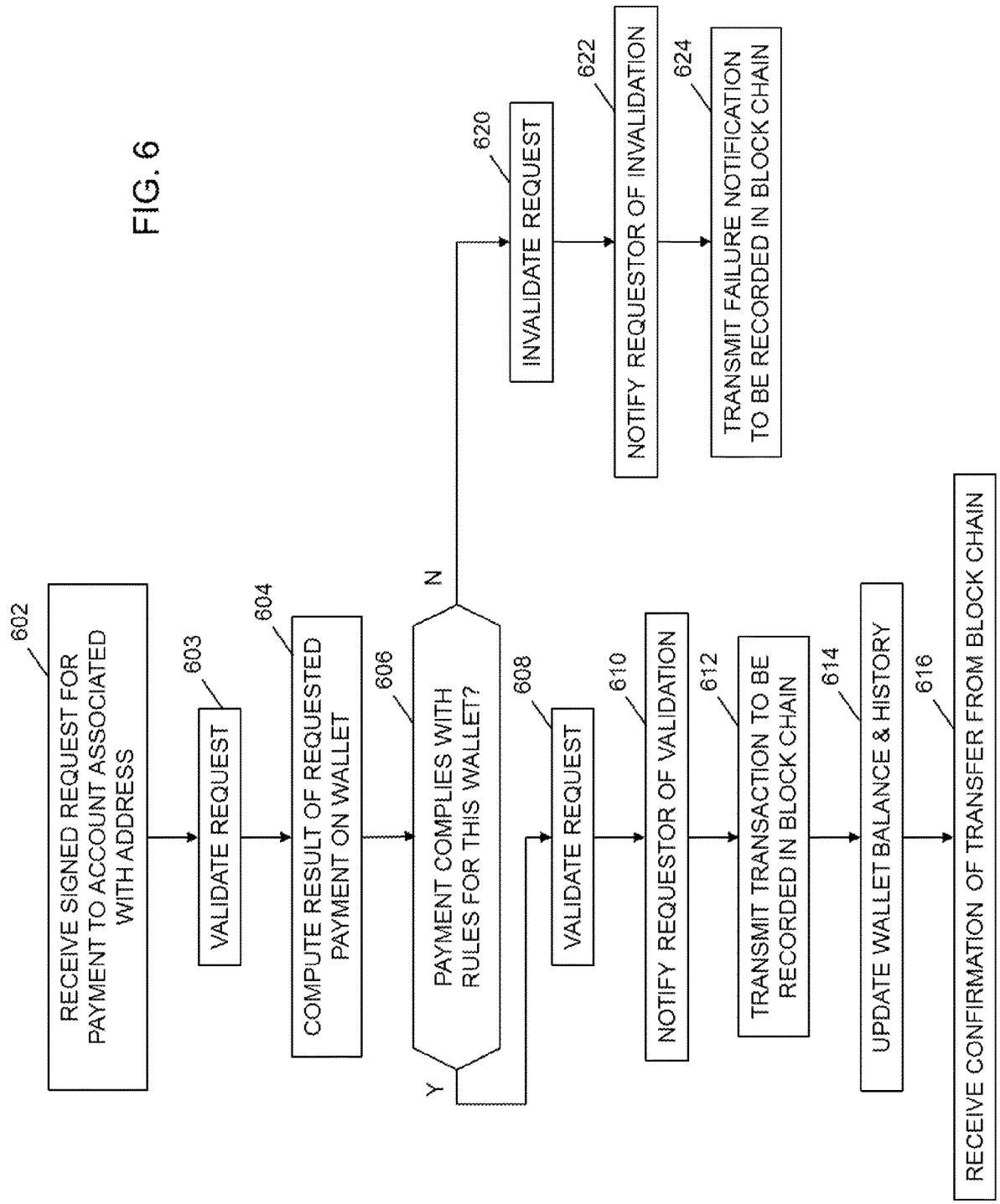
FIG. 6 is a flow chart of an example of using the sender (transferor) process of FIG. 5 for obtaining pre-confirmation of an exchange of digital currency.

FIG. 6 is a flow chart of an example of the method performed by the sender (transferor) of digital currency using secure-element-to-secure-element communication of block chain transactions, in which the tracked asset is a digital currency account tracked in a block chain ledger (e.g., "Bitcoin™", "Ethereum™", or the like), and the state change is a payment, gift or donation.

At step 602, a secure element (e.g., the secure element 103 of a client device 102, such as a buyer's mobile device or hardware wallet) receives a signed request to make a payment from a digital currency account associated with an address. In some embodiments, the wrapper of the request includes a hash of the subset of the block chain program that generated the request, and the version ID of the program that generated the request.

At step 603, the secure element 103 validates the request. For example, the secure element 103 locally computes the hash for the version of the program corresponding to the version ID, and compares the received hash to the locally computed hash. If the two hash values match, then the secure element 103 has confirmed the source of the request, and also knows that the program that generated the request has not been tampered with or corrupted, and can be trusted.

At step 604, the secure element 103 computes the result of the requested payment on the account balance. That is, the secure element computes the balance of the account after subtracting the amount indicated in the request.

At step 606, the secure element 508 determines whether the balance computed in step 604 is a permitted balance of the asset. In some embodiments, this step determines whether the state complies with the block chain rules that prevent double spending. In some embodiments, in step 606 secure element 103 first determines whether the balance is greater or equal to zero after subtracting the payment. Then, even in the case where the balance complies with the block chain rules against double spending, secure element 103 determines whether the transaction parameter satisfy any personal constraints associated with the address of the sending digital wallet in secure element 103. For example, the secure element 103 can determine whether the goods purchased are permitted goods, whether the merchant is a preferred merchant, whether the merchant is in a permitted geographical region, or the like. In the case where the transaction complies with the subset of the block chain rules and/or personal constraint parameters stored in the secure element 103, then step 608 is performed. In the case where the transaction does not comply, then step 620 is performed.

At step 608, the secure element 508 validates the transaction to satisfy the request.

At step 610, the secure element 103 generates and sends an exchange confirmation to the secure element 120 that requested payment to notify the requestor of the validation.

At step 612, the secure element 103 generates and sends a transaction to the peer processors 124, 128, 132 to be recorded in the block chain ledger.

At step 614, the secure element 103 updates the account balance 319 and the transaction history 320 for the wallet 318 transferring the digital currency.

At step 616, the secure element 120 generates and sends a confirmation of the transaction to the peer processors 124, 128, 132 to be recorded in the block chain ledger. The client device 102 receives a confirmation from the block chain that the recipient POS 122 has acknowledged receipt in a block chain record.

At step 620, the secure element 103 invalidates the request.

In At step 622, the secure element 103 generates and sends a transaction attempt message to the peer processors 124, 128, 132 to be recorded in the distributed electronic ledger.

At step 624, the secure element 120 generates and sends a confirmation of the exchange failure to the peer processors 124, 128, 132 to be recorded in the distributed electronic ledger.

Figure 7:
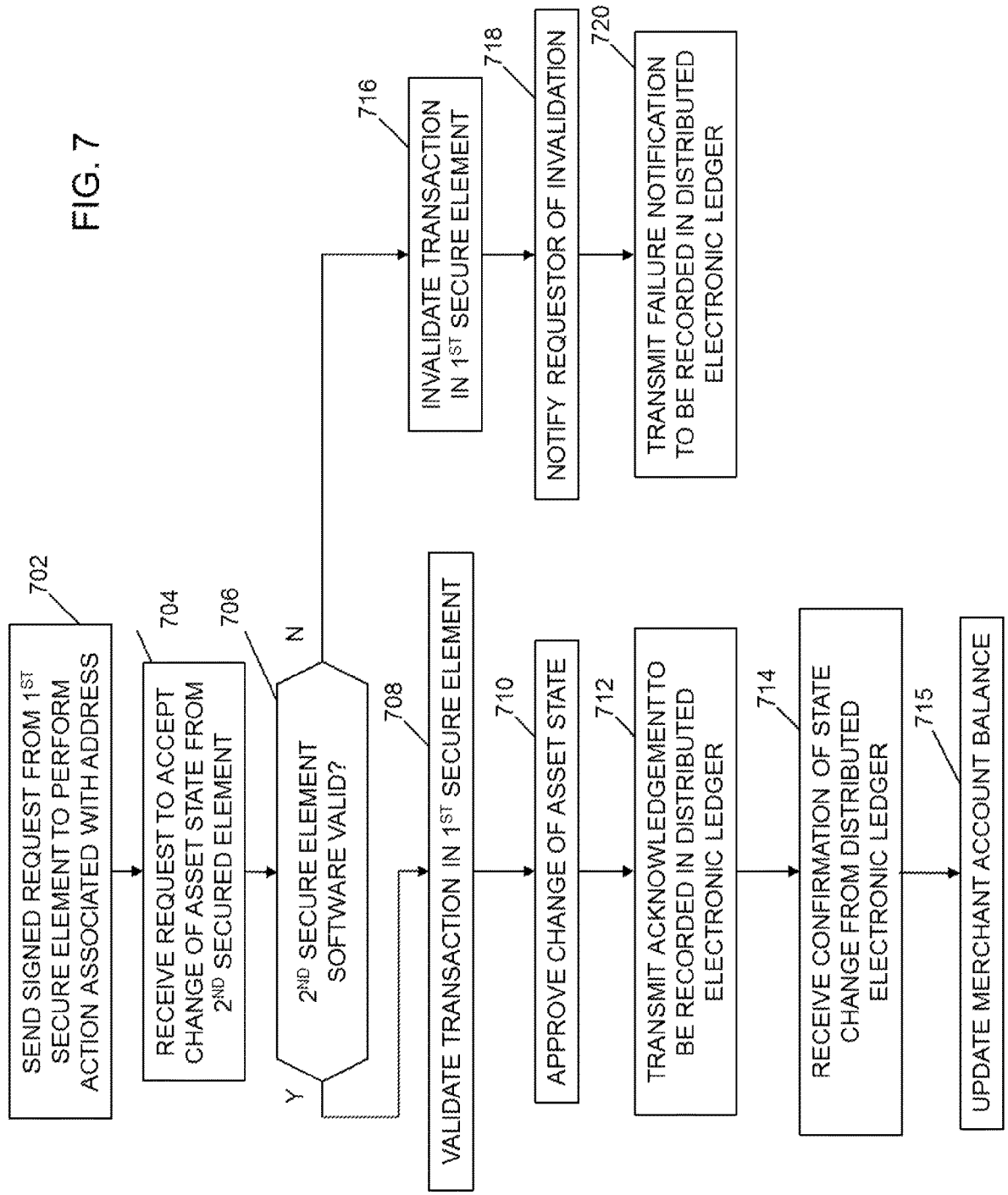
FIG. 7 is a flow chart of a recipient (transferee) process according to some embodiments in an exchange using the system of FIG. 1.

FIG. 7 is a flow chart of a method performed by the recipient (transferee) 122 using secure-element-to-secure-element communication of distributed electronic ledger transactions, according to some embodiments.

At step 702, the recipient 122 of an asset sends a signed first request from the recipient's secure element 120 to the sender's secure element 103. The request tells the sender 102 to perform an action (e.g., transfer an asset) associated with the recipient's address. The wrapper of the first request includes the signature of the recipient 122, a hash of a software program 414 running in the recipient's secure element 120, and a version ID 416 of the program 414 in the recipient's secure element 120.

At step 704, the recipient 122 receives back a second request from the sender 102 to accept a change of state of an asset from the sender's secure element 103 to satisfy the first request. The wrapper of the second request includes the signature of the sender 102, a hash of a software program 332 running in the sender's secure element 103, and a version ID 334 of the program 332 running in the sender's secure element 103.

At step 706, the recipient 122 computes a local hash of the version of the software 332 running the in the sender's secure element 103. If the locally computed hash matches the hash received from the sender 102, then the software of the sender's secure element is determined to be valid and trusted, and step 708 is performed. If the locally computed hash differs from the hash received from the sender, then the software of the sender's secure element 103 is not treated as trusted, and step 716 is performed.

At step 708, the recipient 122 validates (pre-confirms) the second request from the sender to accept the change of state of the asset.

At step 710, the recipient 122 approves the change of state of the asset based on the pre-confirmation and, in some embodiments, authorizes delivery of goods or services to the sender immediately in near-real-time, without waiting for confirmation of the change of state of the asset by the distributed electronic ledger.

At step 712, in some embodiments, the recipient 122 transmits an acknowledgement of the transaction to be recorded in the distributed electronic ledger. In other embodiments, the recipient skips step 712, and proceeds directly to step 714.

At step 714, the recipient 122 receives confirmation of the change of state of the tracked asset from the distributed electronic ledger, based on the transaction sent by the sender to the peer processors of the distributed electronic ledger.

At step 715, the recipient 122 updates the state 419 and transaction history 417 in the wallet 418 within the secure element 120 of the recipient 122.

At step 716, the recipient 122 invalidates the request in the first secure element 120.

At step 718, the recipient 122 notifies the sender 102 of an exchange failure due to the invalidation.

At step 720, the recipient 122 transmits an exchange failure notification to the peer processors 124, 128, 132 to be recorded in the distributed electronic ledger.

Figure 8:
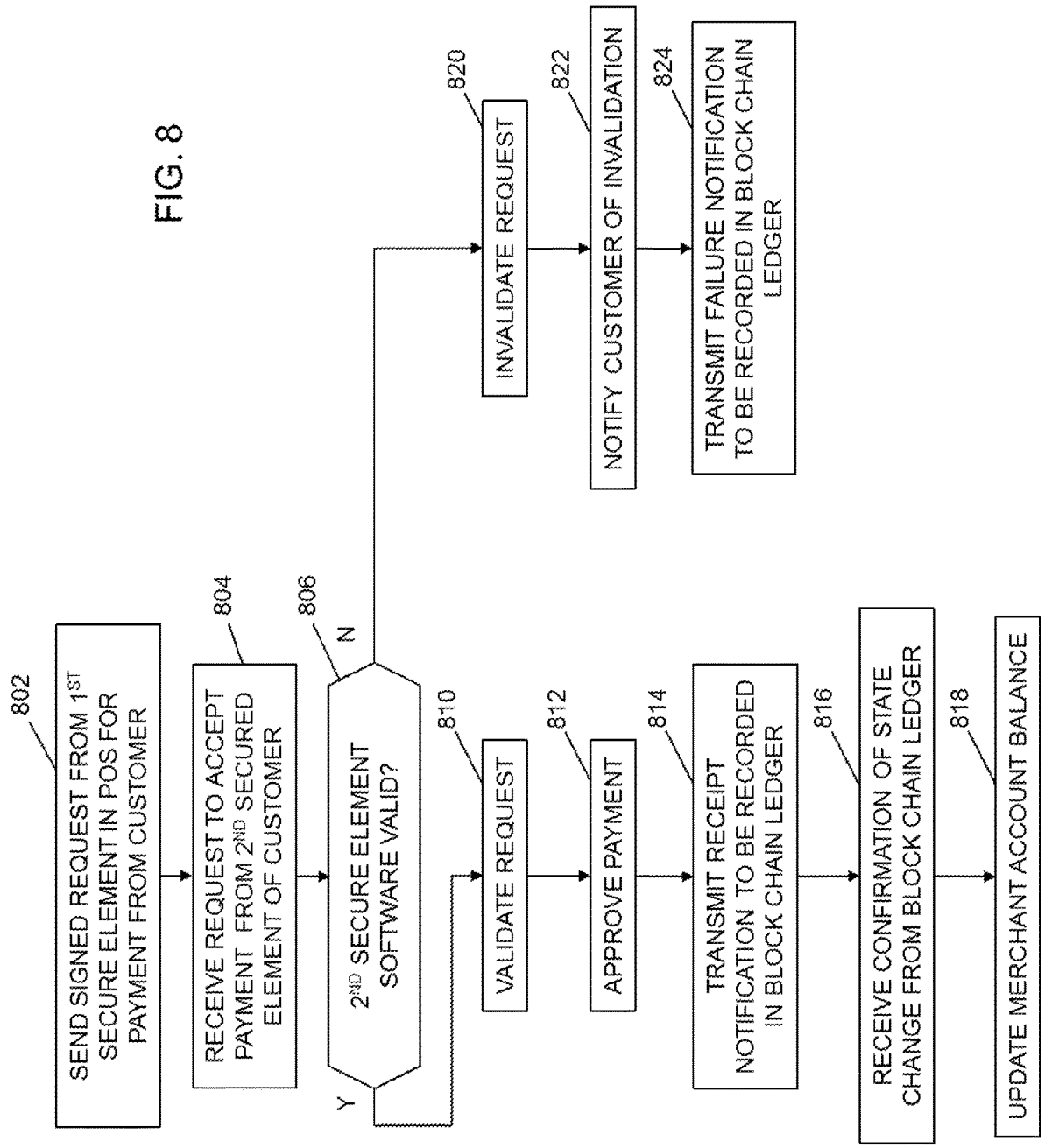
FIG. 8 is a flow chart of an example of using the recipient (transferee) process of FIG. 7 for pre-confirming an exchange of digital currency.

FIG. 8 is a flow chart of an example of the method performed by the recipient (transferee) 122 of digital currency using secure-element-to-secure-element communication of block chain transactions, in which the tracked asset is a digital currency account tracked in a block chain ledger (e.g., "Bitcoin™", "Ethereum™", or the like), and the state change is a payment, gift or donation according to some embodiments.

At step 802, the recipient 122 of digital currency (e.g., a merchant) sends a signed first request from the recipient's secure element 120 to the sender's secure element 103. The request tells the sender 102 of the digital currency to perform an action (e.g., transfer an amount of digital currency to an address designated in the first request). The wrapper of the first request includes the signature of the recipient 122, a hash of a software program instructions 414 running in the recipient's secure element 120, and a version ID 416 of the program instructions 414 in the recipient's secure element 120.

At step 804, the recipient 122 receives back a second request from the sender's secure element 103 to accept a transfer of digital currency from an account associated with the sender's address to satisfy the first request. The wrapper of the second request includes the signature of the sender 102, a hash of a software program instructions 332 running in the sender's secure element 103, and a version ID 334 of the program 332 running in the sender's secure element 103.

At step 806, the recipient 122 computes a local hash of the version of the program instructions 332 running the in the sender's secure element 103. If the locally computed hash matches the hash received from the sender 102, then the software of the sender's secure element 103 is determined to be valid and trusted, and step 808 is performed. If the locally computed hash differs from the hash received from the sender, then the software of the second sender's secure element is not treated as trusted, and step 816 is performed.

At step 810, the recipient 122 validates (pre-confirms) the second request from the sender to accept the transfer of digital currency.

At step 812, the recipient 122 approves the payment in the digital currency from the sender 102 based on the pre-confirmation, and in some embodiments, authorizes delivery of goods or services to the sender immediately in near-real-time, without waiting for confirmation of the transfer of digital confirmation by the distributed electronic ledger.

At step 814, in some embodiments, the recipient 122 transmits an acknowledgement of the transaction to the block chain peer processors 124, 128, 132 to be recorded in the block chain. In other embodiments, the recipient 122 skips step 814, and proceeds directly to step 816.

At step 816, the recipient 122 receives confirmation of the transfer of digital currency from the block chain, where the block chain has been updated based on the transaction sent by the sender 102 to the peer processors 124, 128, 132 of the block chain ledger.

At step 818, the recipient 122 updates the merchant account balance 419 and transaction history 417 in the wallet 418 within the secure element 120 of the recipient 122.

At step 820, the recipient 120 invalidates the request in the first secure element 120. The recipient does not treat the program instructions 332 running in the secure element 103 of the sender 102 as trusted.

At step 822, the recipient 120 notifies the sender 102 of an exchange failure due to the invalidation.

At step 824, the recipient 120 transmits an exchange failure notification to the block chain peer processors 124, 128, 132 to be recorded in the block chain ledger.

Figure 9:
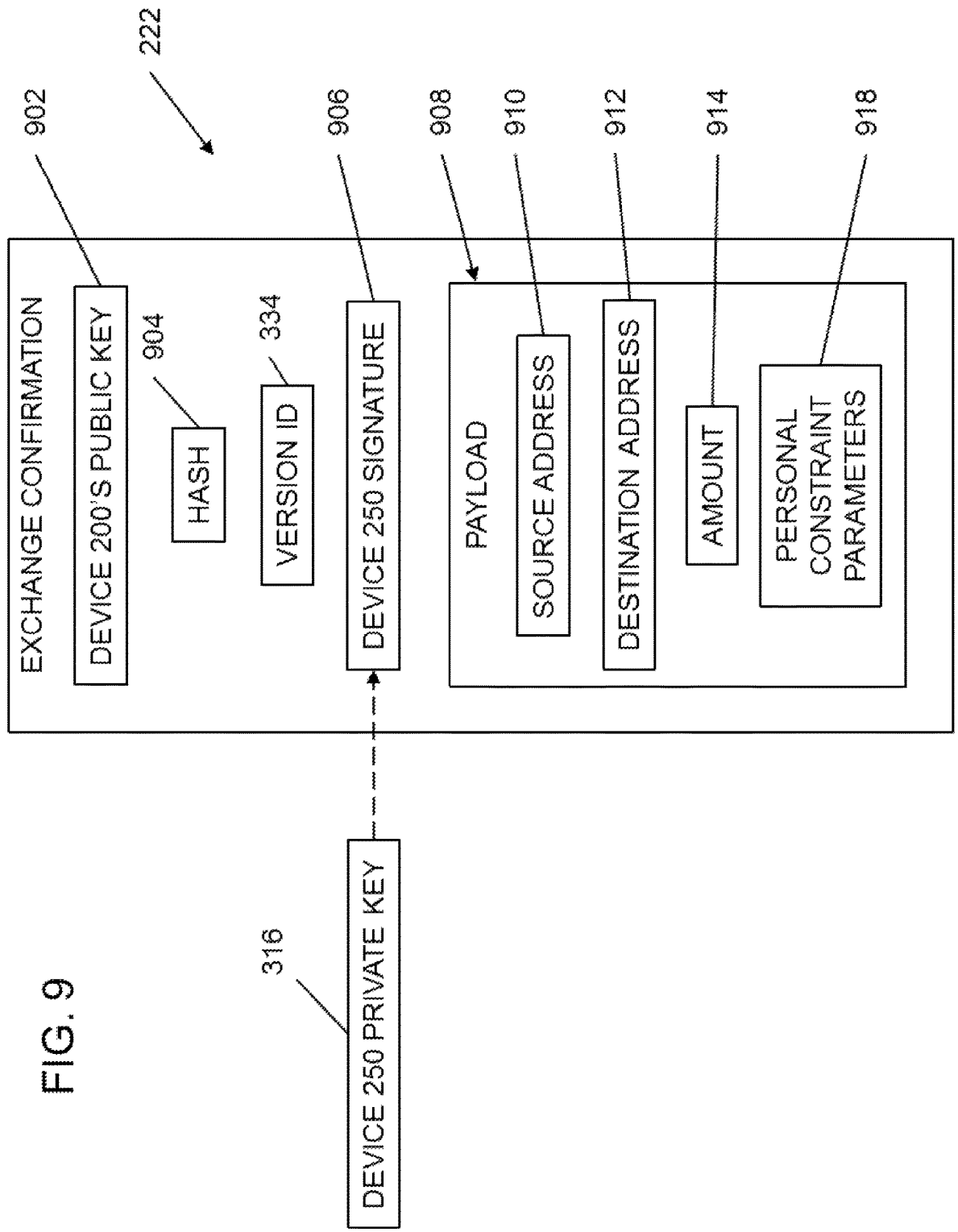
FIG. 9 is a diagram of an exchange confirmation message as shown in FIG. 2.

FIG. 9 is a data structure diagram of an exchange confirmation message 222 of FIG. 2, according to some embodiments. The secure element 103 of the sender device 250 (e.g., the device of buyer or transferor) sends this message to the recipient device 200 upon receipt of the request for payment 220 from device 200. The wrapper of the exchange confirmation message 222 includes a public key 902, a hash 904, a version ID 334 and a signature 906.

The exchange confirmation message 222 has a public key 902 associated with the recipient device 200.

The exchange confirmation message 222 has a hash 904 of the program running in the secure element of device 250. This hash has been generated by the secure element of device 250.

The exchange confirmation message 222 has a field containing the version ID 334 in the secure element of device 250, which identifies the version of the program running in device 250, from which the hash 904 was generated. The version ID 334 is used by the recipient 200 to compute the hash locally for validating the message 222.

The message 222 contains the signature of the sending device 250, which is generated using the private key 316 of the device 250.

The exchange confirmation message 222 further includes a payload 908. The payload includes the information that appear in a transaction record sent to the block chain peer processors 124, 128, 132, including a source address 910, a destination address 912 and an amount 914.

In some embodiments, the payload further includes a set of personal constraint parameters 918 associated with the sender. These personal constraint parameters 918 are user defined parameters, as discussed above, which can limit the use of the device 250 to transmit certain types of transactions, even where the block chain rules would otherwise permit those transactions. In the case where the asset fails to satisfy one or more block chain rules or the transaction fails to satisfy one or more personal constraints, the secure element of device 250 invalidates the transaction.

Figure 10:
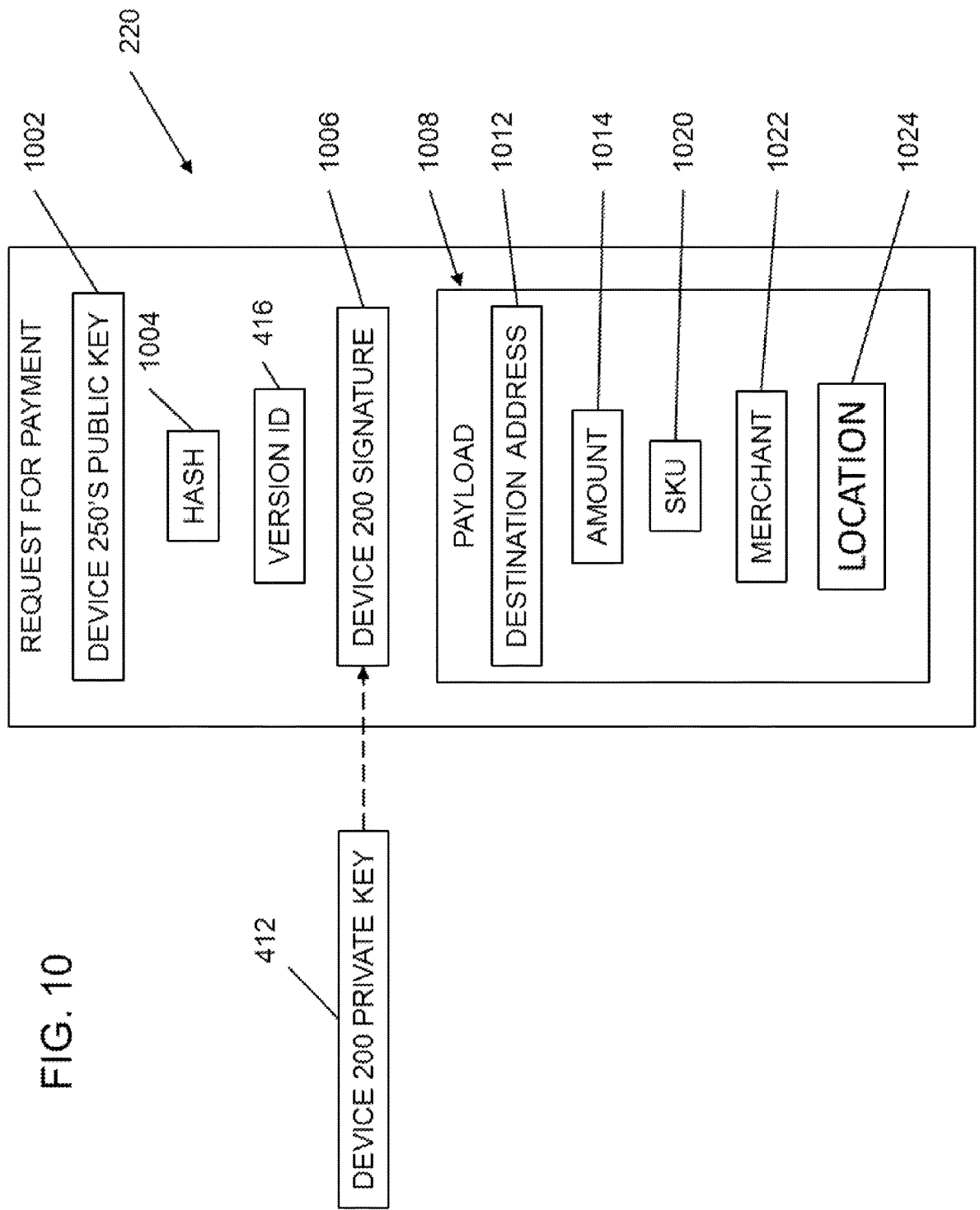
FIG. 10 is a diagram of a request for payment message as shown in FIG. 2.

FIG. 10 is a data structure diagram of a request for payment message 220 of FIG. 2, according to some embodiments. The secure element 120 of the recipient device 200 (e.g., the device of merchant or transferee) sends this message to the sender device 250 to request payment from device 250. The wrapper of the request for payment message 220 includes a public key 1002, a hash 1004, a version ID 416 and a signature 1006.

The request for payment message 220 has a public key 1002 associated with the sender device 250.

The request for payment message 220 has a hash 1004 of the program running in the secure element of device 200. This hash has been generated by the secure element of device 200.

The request for payment message 220 has a field containing the version ID 416 in the secure element of device 200, which identifies the version of the program running in device 200, from which the hash 1004 was generated. The version ID 416 is used by the sender 250 to compute the hash locally for validating the message 220.

The message 220 contains the signature of the recipient device 200, which is generated using the private key 412 of the device 200.

The exchange confirmation message 220 further includes a payload 1008. The payload includes a destination address 1012, to which the payment should be transferred, and an amount 1014. In some embodiments, the request for payment message 220 includes additional information that can be used by the sender 250 to determine whether all personal constrains are satisfied by a transaction initiated by the sender 250 in response to the message 222. The additional information can include the stock keeping unit (SKU) of the goods for which payment is requested, a merchant identifier, and/or a geographic location of where the purchase is made.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A device comprising a secure element, the secure element including:
   a memory that stores instructions; and
   a processor coupled to the memory and configured to execute the instructions to:
      receive, from an additional device, a request to change a state of a digital currency account tracked within a distributed electronic ledger, the requested change being associated with a transaction initiated between the device and the additional device and involving the digital currency account;
      access rules data and a first hash value maintained within one or more ledger blocks of the distributed electronic ledger, the rules data identifying one or more rules associated with the tracked digital currency account, and the first hash value being representative of a first version identifier of a first version of the one or more rules;
      obtain a second hash value from the received request, the second hash value being representative of a second version identifier of a second version of the one or more rules, the second version of the one or more rules being associated with the additional device;
      determine, based on the received request and the accessed rules data, that the requested change complies with the one or more rules, and determine that the first hash value corresponds to the second hash value;
      based on the determination that the first hash value corresponds to the second hash value, establish a consistency between the first and second versions of the one or more rules;
      validate the received request based on the established consistency between the first and second versions of the one or more rules, and based on the determination that the change complies with the one or more rules;
      authorize the initiated transaction in response to the validation of the request, and generate and transmit confirmation data indicative of the authorization of the initiated transaction to the additional device, the confirmation data comprising the first hash value, and the additional device being configured to validate the confirmation data based on the first hash value and to execute the initiated transaction based on the validation of the confirmation data; and
      based on the authorization of the initiated transaction and the transmission of the confirmation data to the additional device, transmit a portion of the request to one or more peer computing systems, the one or more peer computing systems being configured to record the change in the state of the asset in one or more additional ledger blocks of the distributed electronic ledger.

2. The device of claim 1, wherein:
   the distributed electronic ledger comprises a block chain ledger that tracks the digital currency account;
   the one or more rules identifies at least one condition associated with the digital currency account;
   the processor is further configured to execute the instructions to:
      determine, based on the request, that an attribute of the digital currency account satisfies the at least one condition; and
      validate the received request based on the determination that the attribute satisfies the at least one condition.

3. The device of claim 2, wherein:
   the attribute includes an initial balance of the digital currency account; and
   the at least one condition specifies that the initial balance is equivalent to at least an amount specified in the request.

4. The device of claim 1, wherein:
   the distributed electronic ledger comprises a block chain ledger that tracks the digital currency account; and
   the processor is further configured to execute the instructions to:
      load, from the memory, transaction data identifying one or more transactions involving the digital currency account;
      based on the transaction data, determine that each of the one or more transactions complies with the one or more rules; and
      validate the request based on the determination that each of the one or more transactions complies with the one or more rules.

5. The device of claim 4, wherein:
   the transaction data identifies a transaction amount for each of the one or more transactions; and
   the processor is further configured to execute the instructions to:
      determine an adjusted balance of the digital currency account that reflects the transaction amount of each of the one or more transactions; and
      validate the request the adjusted balance of the digital currency account is equivalent to at least an amount specified in the request.

6. The device of claim 1, wherein:
   the memory stores the first version identifier; and
   the processor is further configured to execute the instructions to compute the first hash value based on an application of a hash function to the first version identifier, and transmit the first version identifier and the first hash value to the one or more peer computing systems, the one or more peer computing systems being configured to record the first version identifier and the first hash value within the one or more additional ledger blocks.

7. The device of claim 6, wherein the processor is further configured to execute the instructions to:
   obtain the one or more ledger blocks of the distributed electronic ledger from the memory; and
   obtain the first version identifier from the one or more ledger blocks.

8. The device of claim 1, wherein:
   the confirmation data further comprises the first version identifier; and
   the additional device is further configured to:
      obtain a third version identifier of the second version of the one or more rules;

determine that a third hash value representative of the third version identifier corresponds to the first hash value, and validate the confirmation data based on the determination that the third hash value corresponds to the first hash value; and execute the initiated transaction based on the validation of the confirmation data.

9. The device of claim 8, wherein the additional device is further configured to generate and transmit information characterizing the executed transaction to the one or more peer systems, the one or more peer systems being configured to record the information within the one or more additional ledger blocks.

10. The device of claim 1, wherein:
the request comprises the second hash value and the second version identifier; and
the processor is further configured to execute the instructions to:
obtain at least the second hash value from the received request;
determine that the second hash value fails to correspond to the first hash value, and based on the determination that the second hash value fails to correspond to the first hash value, establish an inconsistency between the first and second versions of the one or more rules; and
based on the established inconsistency between first and second versions of the one or more rules, generate and transmit a failure message to the additional device, the failure message being indicative of a failure to validate the received request.

11. The device of claim 1, wherein the processor is further configured to execute the instructions to:
determine, based on the received request and the accessed rules data, that the requested change fails to comply with the one or more rules; and
based on the determination that the requested change fails to comply with the one or more rules, transmit a failure message to the additional device, the failure message being indicative of a failure to validate the received request.

12. The device of claim 1, wherein the received request comprises a wallet address of the digital currency account.

13. The device of claim 10, wherein the processor is further configured to execute the instructions to obtain, from the one or more ledger blocks, a portion of the rules data associated with the wallet address, the obtained portion of the rules data identifying the one or more rules.

14. The device of claim 10, wherein the processor is further configured to execute the instructions to:
obtain, from the one or more ledger blocks, constraint data associated with the wallet address, the constraint data identifying one or more constraints imposed on the digital currency account;
determine that the change is consistent with the one or more imposed constraints; and
validate the received request based on the determination that the change is consistent with the one or more imposed constraints, and based on the determination that the change complies with the one or more one or more rules.

15. A computer-implemented method, comprising:
receiving, by a secure element of a device, a request from an additional device to change a state of a digital currency account tracked within a distributed electronic ledger, the requested change being associated with a transaction initiated between the device and the additional device and involving the digital currency account;
accessing, by the secure element of the device, rules data and a first hash value maintained within one or more ledger blocks of the distributed electronic ledger, the rules data identifying one or more rules associated with the tracked digital currency account, and the first hash value being representative of a first version identifier of a first version of the one or more rules;
obtaining, by the secure element of the device, and from the received request, a second hash value representative of a second version identifier a second version of the one or more rules, the second version of the one or more rules being associated with the additional device;
based on the received request and the accessed rules data, determining, by the secure element of the device, that the change complies with the one or more rules;
by the secure element of the device, determining that the first hash value corresponds to the second hash value;
by the secure element of the device, establishing a consistency between the first and second versions of the one or more rules based on the determination that the first hash value corresponds to the second hash value;
by the secure element of the device, validating the received request based on the established consistency between the first and second versions of the one or more rules, and based on the determination that the requested change complies with the one or more rules;
by the secure element of the device, authorizing the initiated transaction in response to the validation of the request, and generating and transmitting confirmation data indicative of the authorization of the initiated transaction to the additional device, the confirmation data comprising the first hash value, and the additional device being configured to validate the confirmation data based on the first hash value and to execute the initiated transaction based on the validation of the confirmation data; and
based on the authorization of the initiated transaction and the transmission of the confirmation data to the additional device, and by the secure element of the device, transmitting a portion of the request to one or more peer computing systems, the one or more peer computing systems being configured to record the change in the state of the asset in one or more additional ledger blocks of the distributed electronic ledger.

16. A device comprising a secure element, the secure element including:
a memory that stores instructions, and
a processor coupled to the memory and configured to execute the instructions to:
generate and transmit a request to change a state of-an-digital currency account tracked within a distributed electronic ledger, and transmit the generated request to an additional device, the request comprising a first hash value representative of a first version identifier of a first version of one or more rules-associated with the digital currency account and maintained within one or more ledger blocks of a distributed electronic ledger, the requested change being associated with a transaction initiated between the device and the additional device and involving the digital currency account, and the additional device being configured to:
access rules data and a second hash value maintained within the one or more ledger blocks of the distributed electronic ledger, the rules data identifying a second version of the one or more rules, the second hash value being representative of a second version identifier of the second version of the one or more rules;

determine that the requested change complies with the one or more rules associated with the digital currency account based on the received request and the accessed rules data, and determine that the first hash value corresponds to the second hash value;

based on the determination that the first hash value corresponds to the second hash value, establish a consistency between the first and second versions of the one or more rules;

validate the received request based on the established consistency between the first and second versions, and based on the determination that the change complies with the one or more rules; and authorize the initiated transaction in response to the validation of the request;

receive confirmation data from the additional device, the confirmation data comprising the second hash value and being indicative of the authorization of the initiated transaction by the additional device;

validate the confirmation data based on at least the second hash value, and execute the authorized transaction based on validation of the confirmation data; and transmit information characterizing the executed transaction to one or more peer computing systems, the one or more peer computing systems being configured to record the information within the one or more additional ledger blocks of the distributed electronic ledger.

17. The device of claim 16, wherein:
the request comprises a wallet identifier associated with the digital currency account and a transaction amount associated with the transaction.

18. The device of claim 16, wherein:
the processor is further configured to execute the instructions to obtain the first version identifier from the memory, compute the first hash value representative of the first version identifier, and generate the request, the request further comprising the first version identifier; and the additional device is configured to:
determine that the second hash value corresponds to the first hash value; and
validate the received request based on the established consistency between the first and second versions of the one or more of rules.

19. The device of claim 16, wherein:
the confirmation data further comprises the second version identifier;
the processor is further configured to execute the instructions to
obtain a third version identifier of the first version of the one or more rules;
determine that a third hash value representative of the third version identifier corresponds to the second hash value; and
validate the confirmation data based on the determination that the third hash value corresponds to the second hash value.

20. The device of claims 1, wherein:
the initiated transaction comprises a purchase transaction;
the device is operable by a first counterparty to the transaction, and the additional device is operated by a second counterparty to the transaction;
the request comprises a payment request that includes a transaction amount associated with the initiated transaction, the transaction amount corresponding to a payment requested by the second counterparty from the first counterparty; and
the transaction amount comprises units of a digital currency associated with the digital currency account.

21. The device of claims 1, wherein:
the additional device maintains the second version of the one or more rules;
the request comprises the first version identifier and the first hash value;
the first version of the one or more rules is associated with the device; and
the at least one processor is further configured to execute the instructions to:
obtain the one or more ledger blocks of the distributed electronic ledger from the memory; and
obtain the rules data and the second hash value from the one or more ledger blocks.

* * * * *